US008499570B2

(12) United States Patent
Eggen et al.

(10) Patent No.: US 8,499,570 B2
(45) Date of Patent: *Aug. 6, 2013

(54) METHOD AND APPARATUS FOR PROVIDING ADDITIVE FLUIDS TO REFRIGERANT CIRCUIT

(75) Inventors: Mark Eggen, Lake Worth, FL (US); Phil Eggen, Lake Worth, FL (US); Paul Erdek, Lake Worth, FL (US)

(73) Assignee: Tire Seal, Inc., Lake Worth, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,866

(22) Filed: Jun. 5, 2012

(65) Prior Publication Data

US 2012/0240601 A1    Sep. 27, 2012

Related U.S. Application Data

(60) Continuation of application No. 13/276,808, filed on Oct. 19, 2011, which is a division of application No. 12/615,417, filed on Nov. 10, 2009, now Pat. No. 8,047,009.

(60) Provisional application No. 61/121,088, filed on Dec. 9, 2008.

(51) Int. Cl.
*F25B 45/00* (2006.01)

(52) U.S. Cl.
USPC ................................. 62/77; 62/292

(58) Field of Classification Search
USPC .. 62/77, 84, 149, 292, 177, 298, 474; 137/218, 137/564.5
See application file for complete search history.

(56) References Cited

U.S. PATENT DOCUMENTS

| | | | |
|---|---|---|---|
| 3,169,670 A | 2/1965 | Hrebenak et al. | |
| 3,974,847 A | 8/1976 | Hodges | |
| 4,032,064 A * | 6/1977 | Giggard | 222/95 |
| 4,134,276 A | 1/1979 | Lampard | |
| 4,159,789 A | 7/1979 | Stoody | |
| 4,189,069 A * | 2/1980 | Stoody | 222/83.5 |
| 4,212,373 A | 7/1980 | Scragg | |
| 4,265,373 A * | 5/1981 | Stoody | 222/94 |
| 4,346,743 A | 8/1982 | Miller | |
| 4,635,848 A | 1/1987 | Little | |
| 4,804,065 A | 2/1989 | Scragg | |
| 4,886,212 A | 12/1989 | Proctor et al. | |
| 5,048,301 A | 9/1991 | Sabin et al. | |
| 5,092,996 A | 3/1992 | Spielberg | |
| 5,115,944 A * | 5/1992 | Nikolich | 222/94 |
| 5,179,780 A | 1/1993 | Wintersteen et al. | |
| 5,306,269 A | 4/1994 | Lewis et al. | |

(Continued)

FOREIGN PATENT DOCUMENTS

CA    2469966    12/2005
WO    2007085480 A1    8/2007

*Primary Examiner* — Mohammad M Ali
(74) *Attorney, Agent, or Firm* — Akerman Senterfitt

(57) ABSTRACT

A refrigerant additive supply device can include an outer rigid container, an inner flexible bag positioned in the outer rigid container and defining a space therebetween where the inner flexible bag contains an additive without a refrigerant, a valve in fluid communication with the inner flexible bag, an actuator operably coupled to the valve, and a propellant sealed within the space, where the inner flexible bag has a device pressure that allows flow of the additive into a refrigerant circuit when the actuator is depressed. Other embodiments are disclosed.

20 Claims, 3 Drawing Sheets

U.S. PATENT DOCUMENTS

| | | | |
|---|---|---|---|
| 5,375,425 A | 12/1994 | Cobb | |
| 5,440,919 A | 8/1995 | Cooper | |
| 5,505,039 A * | 4/1996 | Maier | 53/432 |
| 5,799,469 A * | 9/1998 | Obrist | 53/470 |
| 5,915,595 A * | 6/1999 | Dow et al. | 222/95 |
| 5,957,333 A | 9/1999 | Losenno et al. | |
| 5,996,651 A | 12/1999 | Scaringe | |
| 6,085,945 A * | 7/2000 | Fransen | 222/402.18 |
| RE36,951 E | 11/2000 | Cooper et al. | |
| 6,260,544 B1 | 7/2001 | Spry et al. | |
| 6,293,138 B1 | 9/2001 | Konieczny et al. | |
| 6,345,739 B1 * | 2/2002 | Mekata | 222/389 |
| 6,375,046 B1 * | 4/2002 | Alleard et al. | 222/386.5 |
| 6,481,221 B2 | 11/2002 | Ferris et al. | |
| 6,494,609 B1 | 12/2002 | Wittbold et al. | |
| 6,722,141 B2 | 4/2004 | Ferris et al. | |
| 6,880,587 B1 | 4/2005 | Carter et al. | |
| 6,938,651 B1 | 9/2005 | Carter et al. | |
| 7,523,767 B2 * | 4/2009 | Pericard | 141/10 |
| 7,726,139 B2 | 6/2010 | Maier-Laxhuber | |
| 2002/0007804 A1 | 1/2002 | Tichenor et al. | |
| 2002/0124577 A1 | 9/2002 | Ferris et al. | |
| 2002/0124578 A1 | 9/2002 | Ferris et al. | |
| 2002/0174664 A1 | 11/2002 | Ferris et al. | |
| 2008/0037908 A1 | 2/2008 | Kunstmann et al. | |
| 2008/0319385 A1 | 12/2008 | Kriesel et al. | |

* cited by examiner

METHOD AND APPARATUS FOR PROVIDING ADDITIVE FLUIDS TO REFRIGERANT CIRCUIT

CROSS-REFERENCE TO RELATED APPLICATIONS

This application is a continuation of U.S. patent application Ser. No. 13/276,808 filed Oct. 19, 2011, which is a divisional of U.S. patent application Ser. No. 12/615,417, filed Nov. 10, 2009, now U.S. Pat. No. 8,047,009 which claims priority to U.S. Provisional Patent Application No. 61/121,088, filed Dec. 9, 2008, the entirety of which are incorporated herein by reference.

FIELD OF THE INVENTION

The invention relates to refrigerant systems and in particular providing additives to refrigerant circuits.

BACKGROUND OF THE INVENTION

Refrigerant systems utilize circuits that circulate refrigerant in order to facilitate heat transfer and remove heat from a target area. Various components can be coupled to the refrigerant circuit depending on the type of system being utilized, such as a compressor of an automobile's air conditioning system.

Refrigeration systems often utilize additive fluids with the refrigerant in the refrigerant circuit to maintain the performance of the system at a satisfactory level. Examples of additive fluids placed in refrigerant circuits include compressor lubricant, Ultraviolet or other leak detection dye, leak stop material, performance enhancers, acid neutralizers, drying agents, and other A/C circuit fluids. These additive fluids can be introduced into the system by pre-mixing the additive fluid with the refrigerant fluid and expelling the mixture into the circuit and by utilizing a mechanical piston to inject the additive fluid into the circuit.

SUMMARY

In one exemplary embodiment, a method of providing additive to a refrigerant circuit is provided. The method can include connecting a supply device to the refrigerant circuit at a portion of the refrigerant circuit where a circuit pressure is less than a device pressure where the supply device has an outer container with an inner bag therein and where the inner bag contains the additive; and actuating a valve of the supply device to allow flow of the additive into the refrigerant circuit, where the additive is not pre-mixed with refrigerant.

In another exemplary embodiment, a refrigerant additive supply device is provided that can include an outer rigid container; an inner flexible bag positioned in the outer rigid container and defining a space therebetween where the inner flexible bag contains an additive without a refrigerant; a valve in communication with the inner flexible bag; an actuator operably coupled to the valve; and a propellant sealed within the space, where the inner flexible bag has a device pressure that allows flow of the additive fluid into a refrigerant circuit when the actuator is depressed.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

The exemplary embodiments described herein provide a method and apparatus for introducing or otherwise adding additive fluids to a refrigerant circuit, such as in an A/C system of an automobile. The additive fluids can be of various types, including compressor lubricant (such as PAG, POE, PAO, mineral oil and so forth), U/V or other leak detection dye, leak stop, A/C system performance enhancer or other A/C circuit fluid, and the exemplary embodiments are not intended to be limited to the type of additive fluid. The exemplary embodiments describe the apparatus and method with respect to an A/C system of an automobile but the present disclosure contemplates use of the exemplary embodiments with other types of refrigerant circuits. The exemplary embodiments can introduce the additive fluid to the refrigeration circuit without the use of refrigerant or an expensive oil injection tool. The exemplary embodiments are environmentally friendly, as they do not utilize refrigerant, and they facilitate the transfer of additive fluids to the refrigerant circuit.

Figure 1:
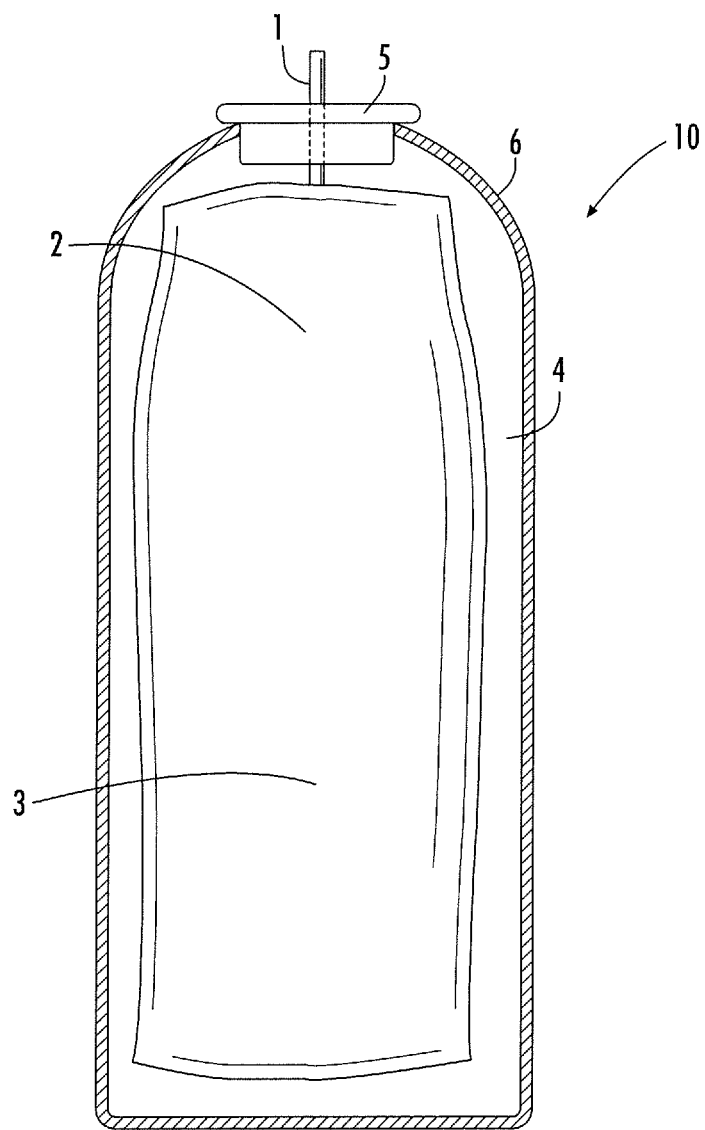
FIG. 1 shows a schematic illustration of a device according to one exemplary embodiment of the present invention for providing additive fluid to a refrigeration circuit.

Referring to FIG. 1, a supply device 10 can include a container or can 6 having a valve 1, a bag or inner container 2 with the additive 3 therein, a propellant 4 and an actuator 5. In one embodiment, the additive 3 can be a fluid, although it can also be a flowable powder, a mixture of a power and a fluid, etc. In one embodiment, the propellant 4 can be nitrogen, although the use of air or other gas is contemplated by the present disclosure. Various sizes and shapes for the supply device 10 and its components can be utilized.

In one embodiment, the supply device 10 can include a supply canister or aerosol with a Bag-On-Valve system within which may have an aerosol valve with a welded bag. The Bag-On-Valve system can have compressed air or other suitable gas in the supply canister or aerosol can on the outside of the bag which acts as a propellant on the circuit additive fluid which is inside the bag.

Figure 2:
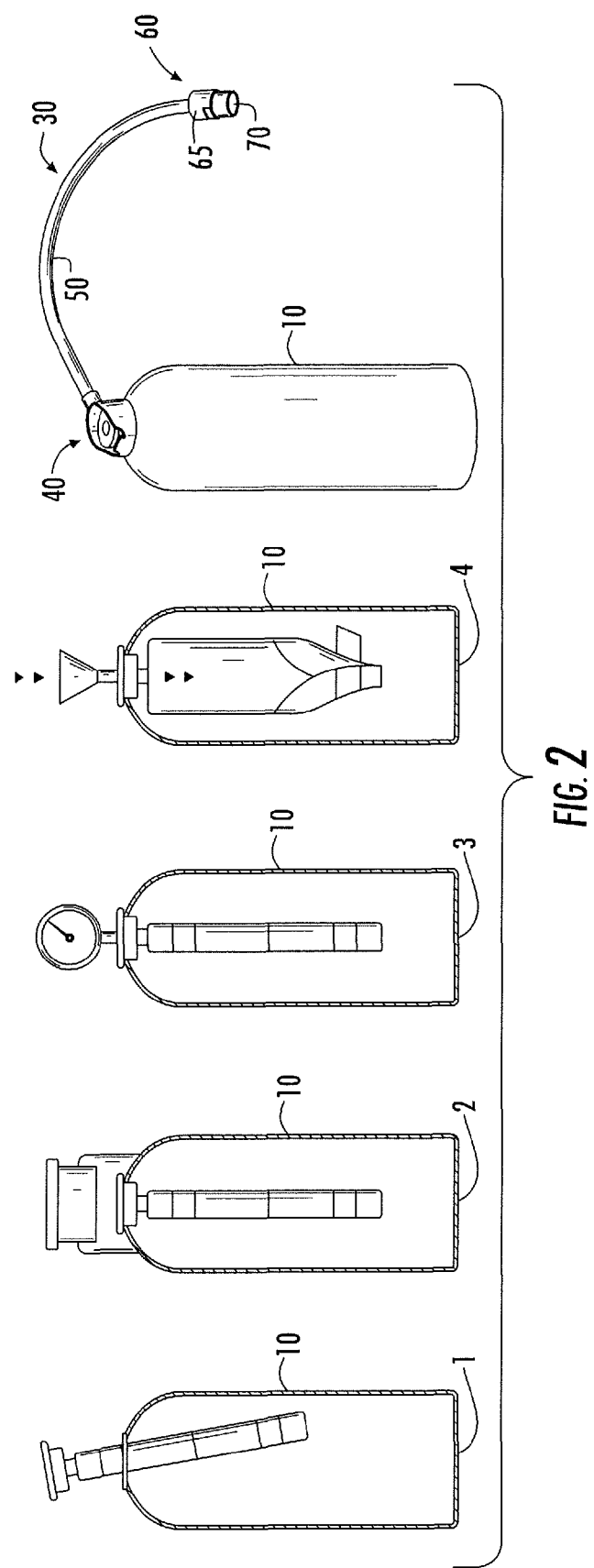
FIG. 2 shows a process according to one exemplary embodiment of the present invention for manufacturing the device of FIG. 1.

Referring additionally to FIG. 2, one exemplary process for filling the supply device 10 is shown. For example, the valve 1 can be preassembled with the bag 2 and then positioned in the can 6. As another example, the valve 1 can be engaged with a rim or other structure of the can 6, such as through a crimping process. An under-the-cup gassing process can be utilized to increase the pressure in the can to a desired amount, such as 100 psi, which can be utilized with a pressure control step. Example pressures that may be employed are in the range of 25-140 psi, with a preferred range of 65-110 psi. The bag 2 can then be filled with the additive 3, such as through the valve 1 or other access port. The filling step can be performed in a number of different ways, including through weighting. In one embodiment, the can 6 can be sealed to atmosphere once the crimping process and under-the-cup steps occur so that there is no venting of the space between the bag 2 and the can 6. In another embodiment, the bag 2 can be a pleated or other reconfigurable container (such as an accordion-shaped container) that has an inner volume that can be expanded through reconfiguration of the shape of the bag rather than stretching of the bag walls when the additive fluid is filled therein. In another embodiment, the propellant can be further pressurized by the filling of the bag 2 with the additive 3. The particular pressure can vary. For example, the pressure can be greater than the operating refrigerant circuit pressure (such as 30-60 psi) to facilitate introduction of the additive 3 into the refrigerant circuit.

The bag 2 can be made from various materials which allow the pressure from the propellant (such as air) in the can 6 to translate into a pressure in the bag. In one embodiment, the bag 2 is made from aluminized plastic. The can 6 can also be made from various materials, including rigid plastic and metals, such as aluminum.

Figure 3:
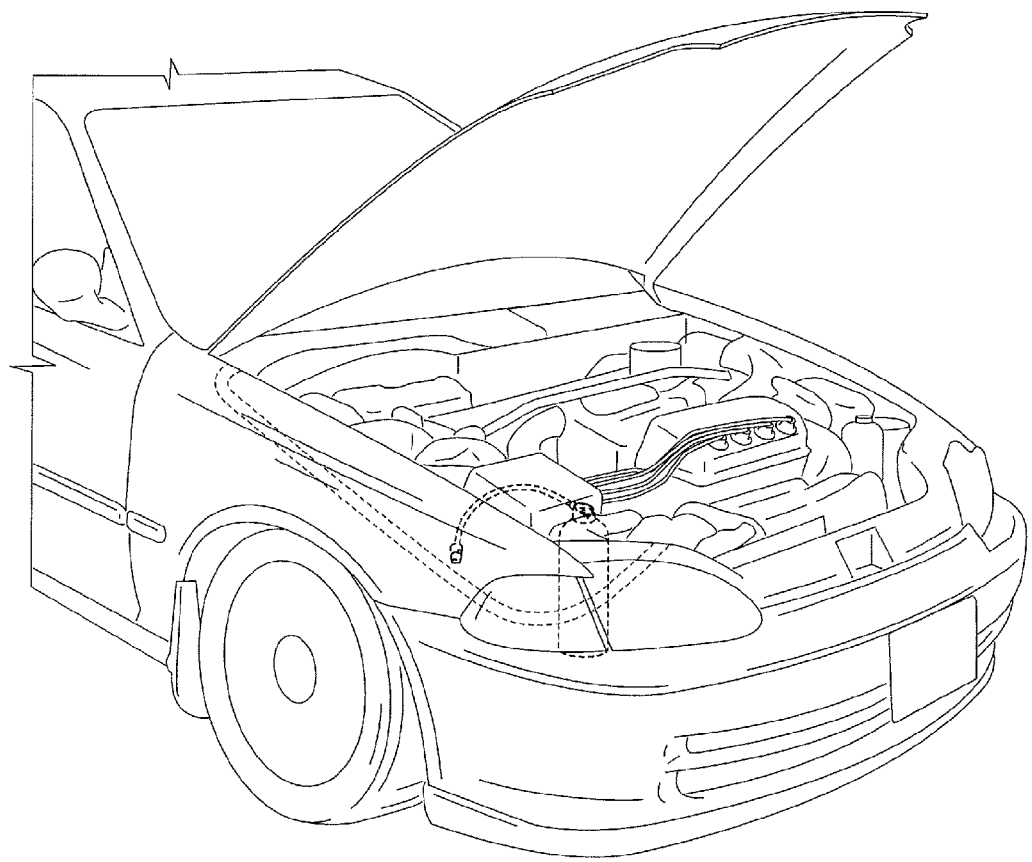
FIG. 3 shows a method according to one exemplary embodiment of the present invention for providing additive fluid to a refrigeration circuit using the device of FIG. 1.

Referring additionally to FIG. 3, in one embodiment, additive fluids from the supply device 10 can be placed into the refrigerant circuit, such as an automotive air conditioning system, by (1) connecting the supply device 10 to the refrigerant circuit after it has been emptied, (2) connecting the supply device to the refrigerant circuit after it has been emptied and vacuum pressure created therein, (3) connecting the supply device to a refrigerant circuit suction line during system operation to draw the contents of the supply device into the refrigerant circuit, and/or (4) connecting the supply device to the refrigerant circuit and allowing a higher pressure in the supply device to force the additive fluid into the circuit.

In one embodiment, additive fluids from the supply device 10 can be introduced to an air conditioning system with a refrigerant material transfer device which can be connectable to the air conditioning system. The device 30 can be flexible and of a size and shape that allows for connection between the supply device 10 and the refrigerant circuit, such as a suction port thereof. The device 30 can have an actuator 40 (which may be pressed, squeezed, turned and so forth to actuate), a fluid conveying tube 50 and a quick connect fitting 60 for attachment to an automotive or other connector of the A/C system. The quick connect fitting 60 can have a one piece plastic body 70 and a plastic locking sleeve 65 mounted on the body for attaching and detaching the quick connect fitting to the air conditioning connector. The present disclosure describes the fitting 60 being made of plastic, but other materials, including metal, are also contemplated. The plastic body 70 can have locking tabs integrally formed therewith for engaging the air conditioning connector. The locking tabs can be moveable between a locked position and an unlocked position. The locking sleeve 65 can retain the locking tab in the locked position. The quick connect fitting 60 can also have cooperating prongs to allow assembly of its components, restrain disassembly, and/or provide frictional forces during relative movement of the sleeve and body. In one embodiment, the quick connect fitting 60 can include a backflow valve to prevent backflow of any refrigerant into the supply device. In another embodiment, the backflow valve can be positioned elsewhere with respect to the supply device, such as incorporated into valve 1.

In another embodiment, a charging hose assembly can be provided that includes a quick disconnect fitting (or another type of connection fitting such as a threaded fitting) interconnected by a length of fluid conveying tube to an actuator which may be pressed or squeezed or turned to release additive fluids from the canister into the air conditioning circuit.

In another embodiment, another charging hose assembly can be provided that includes a quick disconnect fitting (or another type of connection fitting such as a threaded fitting) interconnected by a length of fluid conveying tube to a meter or gauge, of appropriate type to measure the amount of refrigerant circuit additive fluids being added to the system, connected to an actuator which may be pressed or squeezed or turned to release additive fluids from the canister into the air conditioning circuit.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The invention claimed is:

1. A method of providing additive to a refrigerant circuit, the method comprising:
   connecting a pre-pressurized supply device to the refrigerant circuit at a portion of the refrigerant circuit where a circuit pressure is less than a supply device pressure that is a positive pressure above ambient pressure, the pre-pressurized supply device having (1) an outer container with an inner bag therein, (2) a valve interconnected with the inner bag, and (3) a volume of pressurized gas within an interior area of the pre-pressurized supply device that is pre-pressurized to the supply device pressure, the inner bag being pre-filled with a refrigerant system additive through the valve; and
   actuating the valve of the pre-pressurized supply device to allow the volume of pressurized gas within the interior area of the pre-pressurized supply device to force the refrigerant system additive to flow from the inner bag, through the valve, and into the refrigerant circuit, wherein the refrigerant system additive is not pre-mixed with refrigerant prior to the refrigerant system additive exiting the inner bag and entering the refrigerant circuit, such that a performance of the refrigerant circuit is maintained at a satisfactory level.

2. The method of claim 1, further comprising evacuating the refrigerant circuit prior to actuating the valve.

3. The method of claim 1, further comprising connecting the pre-pressurized supply device to a vacuum line and actuating the valve during operation of the refrigerant circuit.

4. The method of claim 1, wherein the gas is selected from the group consisting of air, nitrogen, or other propellant gas.

5. The method of claim 1, further comprising providing a fluid conveying channel with first and second ends, wherein the first end is connected to the pre-pressurized supply device and the second end is connected to the refrigerant circuit.

6. The method of claim 5, wherein the gas is selected from the group consisting of air, nitrogen, or other propellant gas.

7. The method of claim 1, wherein the refrigerant system additive comprises at least one of fluid and powder.

8. The method of claim 1, wherein the refrigerant system additive comprises at least one of compressor lubricant, leak detection dye, leak stop material, and refrigerant performance enhancer.

9. The method of claim 1, wherein the inner bag is an accordion-shaped container.

10. A method of providing additive to a refrigerant circuit, the method comprising:
    positioning an inner bag in contact with one end of a valve within an outer container, the outer container having an opening to an exterior of the outer container;
    engaging a portion of the valve with a rim of the opening of the outer container to form a supply device comprising at least the inner bag, the valve, and the outer container;
    pressurizing an interior of the supply device to a supply device pressure, the supply device pressure being a positive pressure;

filling the inner bag with a refrigerant system additive through the valve of the supply device;

connecting the supply device to the refrigerant circuit at a portion of the refrigerant circuit where a circuit pressure is less than the supply device pressure; and actuating the valve of the supply device to allow the supply device pressure to cause the refrigerant system additive to flow from within the inner bag and into the refrigerant circuit, wherein the refrigerant system additive is not pre-mixed with refrigerant prior to the refrigerant system additive exiting the inner bag and entering the refrigerant circuit, such that a performance of the refrigerant circuit is maintained at a satisfactory level.

11. The method of providing additive to a refrigerant circuit of claim 10, the method comprising pressurizing the interior of the supply device to the supply device pressure using an under-the-cup gassing process to increase pressure within the outer container.

12. The method of claim 10, wherein the refrigerant system additive comprises at least one of fluid and powder.

13. The method of claim 10, wherein the refrigerant system additive comprises at least one of compressor lubricant, leak detection dye, leak stop material, and refrigerant performance enhancer.

14. The method of claim 10, wherein the inner bag is an accordion-shaped container.

15. A method of providing additive to a refrigerant circuit, the method comprising:

positioning an inner bag in fluid communication with a valve within an outer container;

engaging a portion of the valve with a rim of an opening of the outer container to form a supply device comprising the inner bag, the valve, and the outer container;

pressurizing an interior of the supply device to a supply device pressure, the supply device pressure being a positive pressure;

filling the inner bag with a refrigerant system additive through the valve of the supply device;

connecting the supply device to the refrigerant circuit at a portion of the refrigerant circuit where a circuit pressure is less than the supply device pressure; and actuating the valve of the supply device to allow the supply device pressure to cause the refrigerant system additive to flow from within the inner bag, through the valve, and into the refrigerant circuit, wherein the refrigerant system additive is not pre-mixed with refrigerant prior to the refrigerant system additive exiting the inner bag and entering the refrigerant circuit, such that a performance of the refrigerant circuit is maintained at a satisfactory level.

16. The method of claim 15, wherein the inner bag is an accordion-shaped container.

17. The method of claim 15, wherein the refrigerant system additive comprises at least one of fluid and powder.

18. The method of claim 17, wherein the inner bag is an accordion-shaped container.

19. The method of claim 15, wherein the refrigerant system additive comprises at least one of compressor lubricant, leak detection dye, leak stop material, and refrigerant performance enhancer.

20. The method of claim 19, wherein the inner bag is an accordion-shaped container.

* * * * *